March 12, 1935.  G. G. McDONALD  1,993,938
VANITY GEAR SHIFT KNOB

Filed June 28, 1933

Inventor

G. G. McDonald

By Clarence A. O'Brien
Attorney

Patented Mar. 12, 1935

1,993,938

UNITED STATES PATENT OFFICE 1,993,938

VANITY GEAR SHIFT KNOB

General Grant McDonald, Louisville, Ky., assignor of one-half to Samuel Harrison Searcy, Louisville, Ky.

Application June 28, 1933, Serial No. 678,101

1 Claim. (Cl. 206—19.5)

This invention relates to knobs of the type employed in conjunction with the shift lever of an automobile transmission, and in accordance with the present invention there is provided what I term a "vanity gear shift knob".

In accordance with the present invention a knob of the character above mentioned is provided for conveniently holding a compact or what is otherwise known as a "vanity case".

The knob embodying the features of the present invention can be readily applied to the shift lever, will present a neat, attractive and ornamental appearance, and access to the vanity or compact can be readily had.

The invention together with its numerous objects and advantages will be best understood from a study of the following description, taken in connection with the accompanying drawing wherein.

Figure 1:
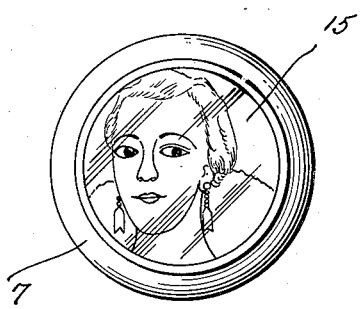
Figure 1 is a plan view of a knob embodying the features of the present invention.

Referring to the drawing by reference numerals it will be seen that the knob is designated generally by the reference character 5. The knob 5 is preferably divided transversely into a body part 6 and a head part 7 having screw threaded engagement with the body part 6 in the manner clearly suggested in Figure 2.

Figure 2:
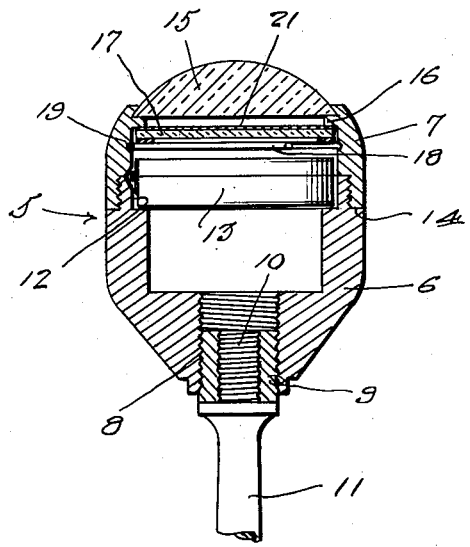
Figure 2 is a longitudinal sectional view through the knob, the same being shown applied to the shift lever.
Figure 3:
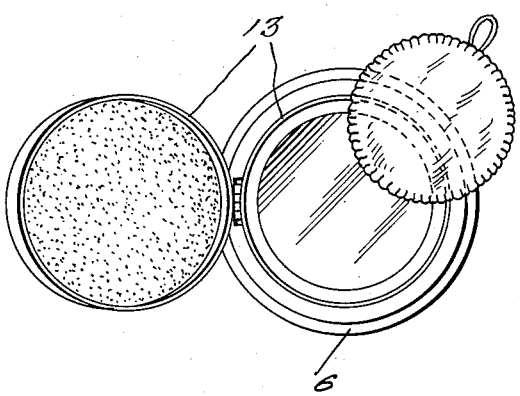
Figure 3 is a plan view of the knob with the head part thereof removed and showing the vanity case in open position and Figure 4 is a bottom plan view of the dome shaped head portion of the knob.

The lower or free end of the body 6 of the knob is substantially frusto-conical and is provided with an axial opening 8 in which is screw threaded a bronze internally and externally threaded bushing 9. The bushing 9 as shown in Figure 2 is adapted to be threadedly engaged with the pin 10 usually provided at the upper end of the shift lever a portion of which is shown in the drawing and designated by the reference numeral 11.

The knob 5 is substantially hollow and the body 6 at its largest end has the interior thereof diametrically enlarged, and the exterior thereof diametrically reduced to provide respectively an annular recess 12 to accommodate a compact 13 and an external annular shoulder 14 together with a reduced externally threaded pin or extension forming the wall of the recess 12 and adapted to be threaded within one end of the cap section 7 of the knob.

The cap or top section 7 of the knob is provided in the top or crown thereof with a bull's eye 15 that is suitably mounted in an opening provided in the top of the cap section 7 and seated on an annular rib 16 provided internally of the cap. After the bull's eye has been seated against the seat 16 the edge portion of the cap is swagged to secure the bull's eye in position.

Figure 4:
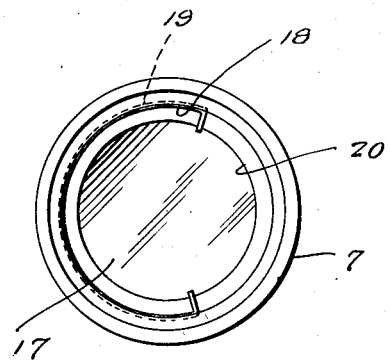

Located within the cap 7 in line with the bull's eye 15 is a mirror 17 that is held in position between the shoulder 16 and a spring 18 seated in an internal groove 19 provided in the top, it being noted that the spring bears against the under side of the mirror and has its end portion turned in as clearly shown in Figure 4 to engage a protecting gasket or washer 20 disposed against the under face of the mirror.

Clamped between the top face of the mirror and the shoulder 16 is a disk 21 that has on the top face thereof in the present instance, a suitable picture. As clearly shown in Figure 1 the picture 21 is clearly visible through the bull's eye 15.

In actual practice the compact 13 rests within the recess 12 of the knob body 6 and the cap 7 together with its associated parts is screwed on to the body 6 for retaining the compact 13 within the knob and concealed from view. Obviously whenever access is desired to the compact the same is obtainable by unscrewing the cap 7 after which the compact may be readily removed from the knob. Also, whenever it is desired to use the mirror 17 the cap 7 is readily unscrewed from the body 6 and the cap with the mirror in operative position can be conveniently held in one end.

It is also apparent that with the knob applied to the lever 11 an ornamental hand grip is provided for the lever and also a knob is provided for convenient carrying of a compact and mirror for use by the operator.

Even though I have herein shown and described the preferred embodiment of the invention, it is to be understood that the same is susceptible of further changes, modifications and improvements coming within the scope of the appended claim.

Having thus described my invention, what I claim as new is:

An article holding knob for a lever comprising a hollow body forming an article receiving chamber with its upper end open and said body having an annular flange at its open end spaced from the interior wall of the body to form a shoulder and also spaced from the exterior wall of the body, said flange being exteriorly screw threaded, a cap having an annular recess in its inner end for receiving the flange, the side wall of the recess being threaded for engagement with the threads of the flange and the internal wall of the cap being flush with the internal wall of the flange, the outer end of the cap having an opening therein, an internal flange on the cap spaced below the opening, a closure member closing the opening and resting on the second mentioned flange, said shoulder and the second mentioned flange forming seats for articles placed in the chamber.

G. G. McDONALD.